United States Patent
Morris

(10) Patent No.: US 8,922,918 B1
(45) Date of Patent: Dec. 30, 2014

(54) SCREEN MAGNIFICATION SYSTEM

(76) Inventor: Elroy E. Morris, Battle Creek, MI (US)

(*) Notice: Subject to any disclaimer, the term of this patent is extended or adjusted under 35 U.S.C. 154(b) by 313 days.

(21) Appl. No.: 13/451,215

(22) Filed: Apr. 19, 2012

(51) Int. Cl.
*G02B 27/02* (2006.01)

(52) U.S. Cl.
USPC .................................. 359/804; 359/802

(58) Field of Classification Search
USPC ............... 359/440, 798–811; 345/8, 87, 901
See application file for complete search history.

(56) References Cited

U.S. PATENT DOCUMENTS

| | | |
|---|---|---|
| 4,051,535 A | 9/1977 | Inglis |
| D298,250 S | 10/1988 | Kildall |
| 4,806,011 A * | 2/1989 | Bettinger ............... 351/158 |
| 4,991,935 A * | 2/1991 | Sakurai ................. 359/804 |
| 5,003,300 A * | 3/1991 | Wells ...................... 345/8 |
| 5,048,928 A | 9/1991 | Davis |
| 5,318,265 A | 6/1994 | Anderson |
| 6,417,894 B1 | 7/2002 | Goff et al. |
| 7,286,306 B2 | 10/2007 | Wu |
| 7,495,846 B1 | 2/2009 | Kappel |
| D612,818 S | 3/2010 | Lents, Jr. |
| 2009/0257136 A1 | 10/2009 | Liu |

OTHER PUBLICATIONS www.google.com; Page Magnifier; internet; as of Feb. 16, 2011.
www.google.com; Television Screen Magnifier; internet; as of Feb. 16, 2011.
www.independentliving.com; Television Screen Magnifier; internet; as of Feb. 16, 2011.
www.independentliving.com; TV Screen Enlarger; internet; as of Feb. 16, 2011.

* cited by examiner

*Primary Examiner* — Loha Ben

(57) ABSTRACT

A corrective lens system for use with a video display screen adapted to correct visual deficiency for a particular user has a mounting frame and a transparent lens centrally located in a mounting frame aperture. A lens front surface and a lens rear surface are shaped to correct visual deficiency for a particular user. The system is positioned at a first specific distance from the video display screen to correct visual deficiency. The user is positioned a second specific distance from the video display screen to correct visual deficiency. The system corrects visual deficiency for the user in a similar manner as a pair of prescription glasses.

1 Claim, 4 Drawing Sheets

SCREEN MAGNIFICATION SYSTEM

BACKGROUND OF THE INVENTION

The use of a lens for vision correction has been common for many years most commonly appearing in a form commonly known as glasses. The wearing of glasses, however, can at times be wearisome or cumbersome for the user. Magnifying glasses have also been used for a number of years as an aid for seeing a specific object more clearly, however, the lens of the magnifying glass is not tailored to the specific vision needs of the user. Magnification screens commonly used on computer displays and televisions offer similar features and advantages when compared to a magnifying glass, however, for convenience, a magnification screen typically can be stationarily placed in front of the display screen. The present invention teaches a corrective lens system for use with a video display screen to correct visual deficiency for a particular user when viewing the video display screen.

SUMMARY

The present invention features a corrective lens system for use with a video display screen adapted to correct visual deficiency for a particular user. In some embodiments, the system comprises a mounting frame. In some embodiments, the system comprises a transparent lens centrally located in a mounting frame aperture.

In some embodiments, a lens front surface is shaped to correct visual deficiency for the particular user. In some embodiments, a lens rear surface is shaped to correct visual deficiency for the particular user. In some embodiments, the system is positioned at a first specific distance from the video display screen to correct visual deficiency. In some embodiments, the user is positioned a second specific distance from the video display screen to correct visual deficiency.

In some embodiments, the system corrects visual deficiency for the user in a similar manner as a pair of prescription glasses.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
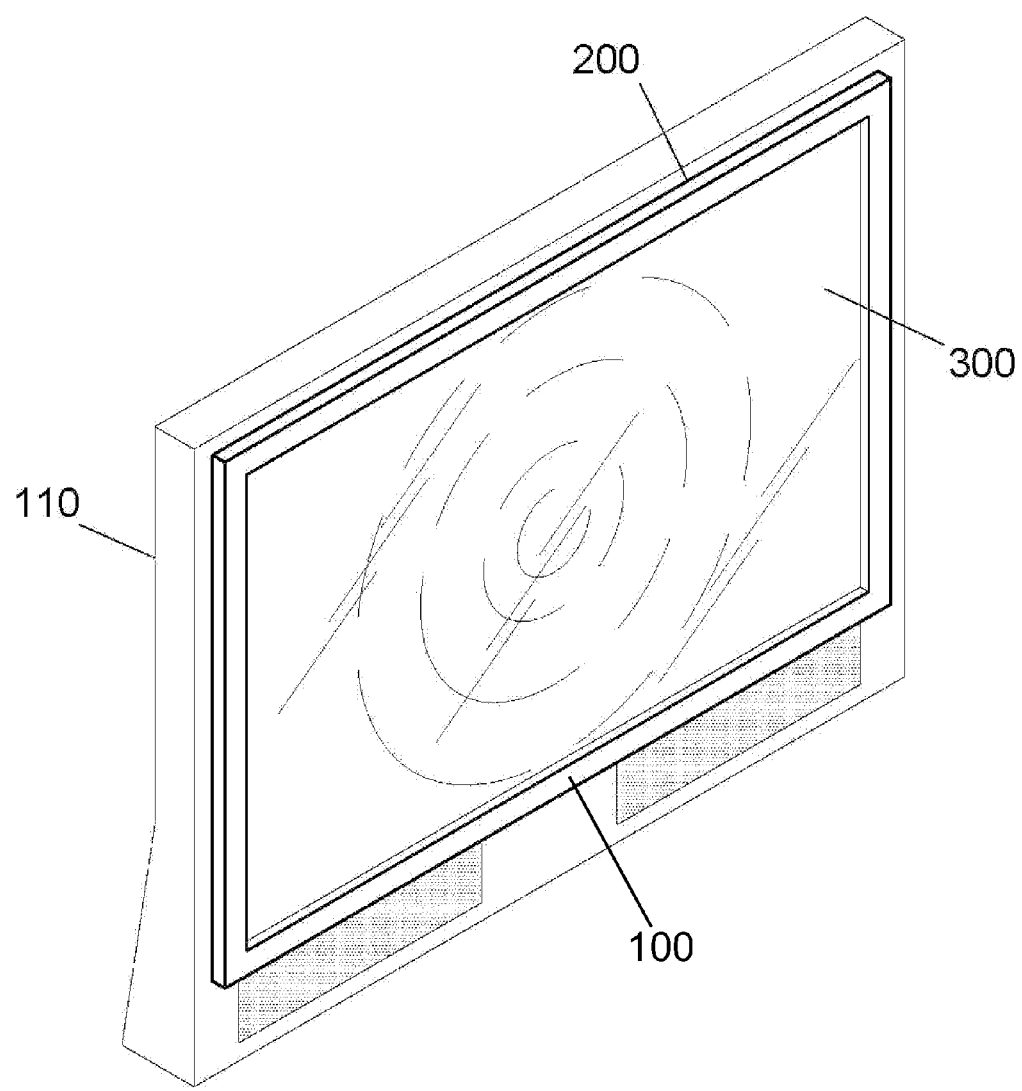
FIG. 1 is a perspective view of the present invention.
Figure 2:
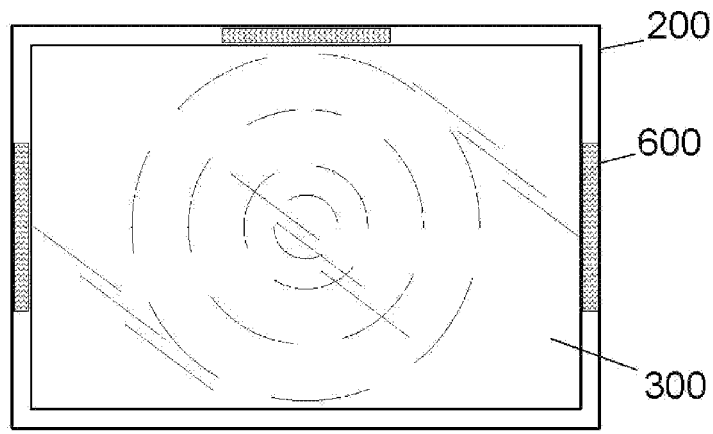
FIG. 2 is a front view of an alternate embodiment of the present invention.
Figure 3:
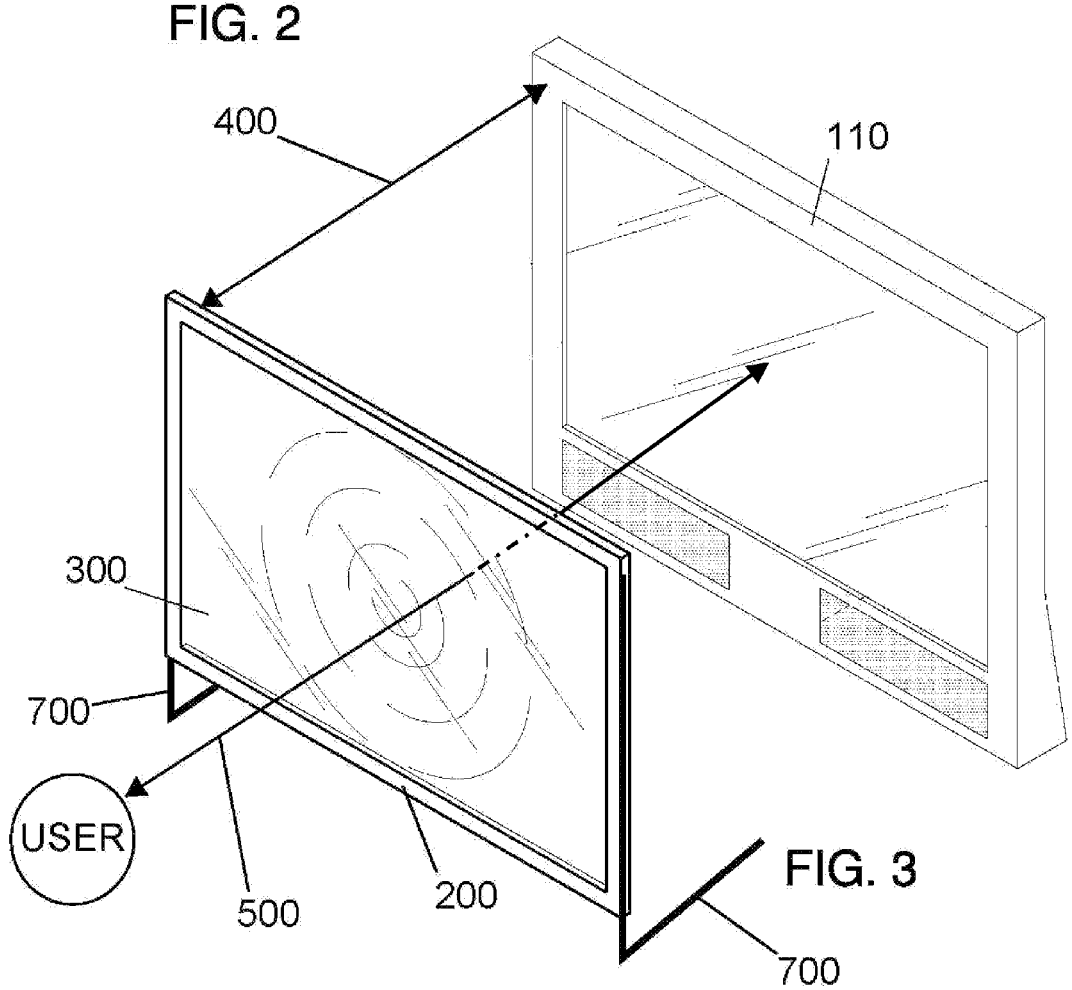
FIG. 3 is a perspective view of an alternate embodiment of the present invention.
Figure 4:
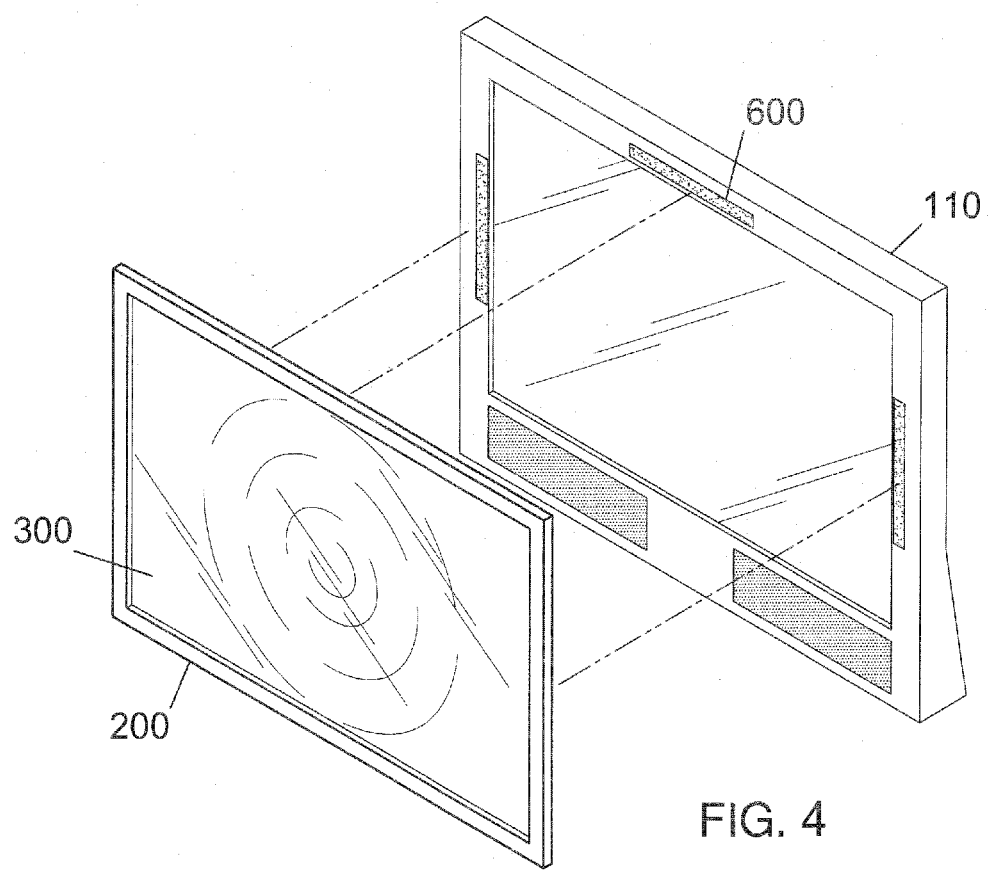
FIG. 4 is a perspective view of an alternate embodiment of the present invention.
Figure 5:
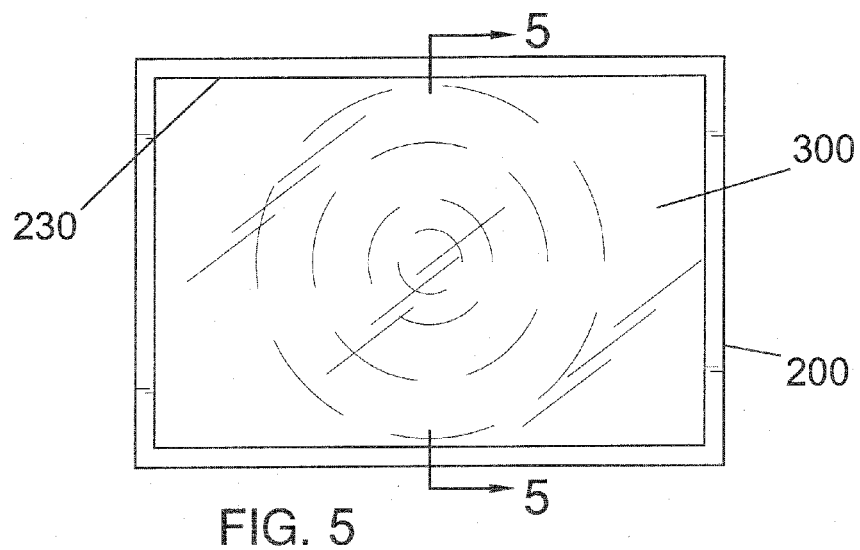
FIG. 5 is a front view of the present invention.
Figure 6:
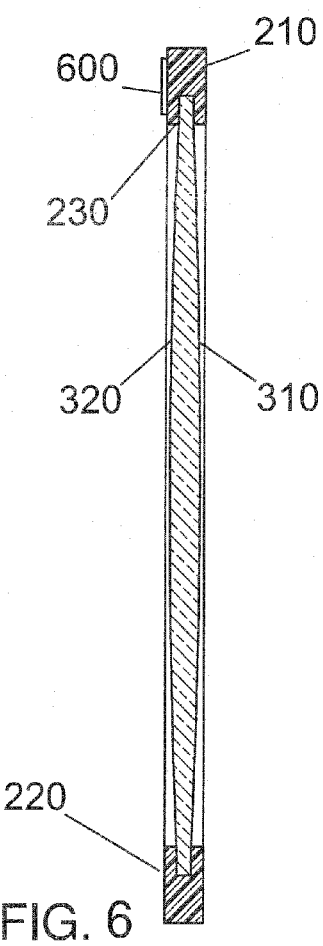
FIG. 6 is a cross-sectional view in a sagittal plane of the present invention.

Following is a list of elements corresponding to a particular element referred to herein:
 100 Corrective lens system
 110 Video display screen
 200 Mounting frame
 210 Frame front surface
 220 Frame rear surface
 230 Frame aperture
 300 Lens
 310 Lens front surface
 320 Lens rear surface
 400 First specific distance
 500 Second specific distance
 600 Attachment means
 700 Stand Referring now to FIGS. 1-6, the present invention features a corrective lens system (100) for use with a video display screen (110) adapted to correct visual deficiency for a particular user. In some embodiments, the system (100) comprises a mounting frame (200) having a frame front surface (210), a frame rear surface (220), and a centrally located frame aperture (230).

In some embodiments, the system (100) comprises a transparent lens (300) centrally located in the frame aperture (230) having a lens front surface (310) and a lens rear surface (320). In some embodiments, the lens front surface (310) is shaped to correct visual deficiency for a particular user. In some embodiments, the lens rear surface (320) is shaped to correct visual deficiency for a particular user.

In some embodiments, the system (100) is positioned at a first specific distance (400) from the video display screen (110) to correct visual deficiency. In some embodiments, the user is positioned a second specific distance (500) from the video display screen (110) to correct visual deficiency. In some embodiments, the system (100) corrects visual deficiency for the user in a similar manner as a pair of prescription glasses.

In some embodiments, the first specific distance (400) is between 1/16 inch and 1 inch. In some embodiments, the first specific distance (400) is between 1 inch and 6 inches. In some embodiments, the first specific distance (400) is between 6 inches and 12 inches. In some embodiments, the first specific distance (400) is greater than 12 inches.

In some embodiments, the second specific distance (500) is between 1/16 inch and 1 inch. In some embodiments, the second specific distance (500) is between 1 inch and 6 inches. In some embodiments, the second specific distance (500) is between 6 inches and 12 inches. In some embodiments, the second specific distance (500) is greater than 12 inches.

In some embodiments, the lens (300) is convex-concave shaped. In some embodiments, the lens (300) is bioconvex shaped. In some embodiments, the lens (300) is plano-convex shaped. In some embodiments, the lens (300) is meniscus shaped. In some embodiments, the lens (300) is plano-concave shaped. In some embodiments, the lens (300) is bioconcave shaped. These shapes are well know to one with ordinary skill in the art.

In some embodiments, the mounting frame (200) comprises an attachment means (600) located on the frame rear surface (220) for attaching to a video display screen (110). In some embodiments, the attachment means (600) is a hook and loop system. In some embodiments, the mounting frame (200) comprises a stand (700) located thereon.

In some embodiments, the lens (300) comprises a diagonal measurement across the lens front surface (310) between 1 inch and 2 inches. In some embodiments, the lens (300) comprises a diagonal measurement across the lens front surface (310) between 2 inches and 4 inches. In some embodiments, the lens (300) comprises a diagonal measurement across the lens front surface (310) between 4 inches and 6 inches. In some embodiments, the Jens (300) comprises a diagonal measurement across the lens front surface (310) between 6 inches and 12 inches. In some embodiments, the lens (300) comprises a diagonal measurement across the lens front surface (310) between 12 inches and 24 inches. In some embodiments, the lens (300) comprises a diagonal measurement across the lens front surface (310) between 24 inches and 36 inches. In some embodiments, the lens (300) comprises a diagonal measurement across the lens front surface (310) between 36 inches and 48 inches. In some embodiments, the lens (300) comprises a diagonal measurement across the lens front surface (310) greater than 48 inches.

In some embodiments, the system (100) is adapted to be used with a mobile telephone video display screen (110). In some embodiments, the system (100) is disposed on the mobile telephone video display screen (110).

In some embodiments, the system (100) is adapted to be used with a computer monitor. In some embodiments, the system (100) is disposed on the computer monitor video display screen (110). In some embodiments, the system (100) is adapted to be used with a television. In some embodiments, the system (100) is disposed on the television video display screen (110).

As used herein, the term "about" refers to plus or minus 10% of the referenced number. For example, an embodiment wherein the diagonal measurement across the lens front surface is about 10 inches in length includes a diagonal measurement across the lens front surface that is between 9 and 11 inches in length.

The disclosures of the following U.S. Patents are incorporated in their entirety by reference herein: U.S. Pat. No. D 612,818; U.S. Pat. No. D 298,250; U.S. Pat. Pub. No. 2009/0257136; U.S. Pat. No. 7,495,846; U.S. Pat. No. 7,286,306; U.S. Pat. No. 6,417,894; U.S. Pat. No. 5,318,265; U.S. Pat. No. 5,048,928; U.S. Pat. No. 4,051,535, Independent Living-TV Screen Enlarger (http://www.independentliving.com/prodinfo.asp?number=107098), Feb. 16, 2011; Independent Living-Television Screen Magnifier (http://www.independentliving.com/products.asp?dept=163&deptname=Television-Screen-...), Feb. 16, 2011; Google Search-Television Screen Magnifier (http://www.google.com/search?q=page+magnifier&hl=en&tbs=shop %3A1&aq=f), Feb. 16, 2011; Google Search-Page Magnifier (http://www.google.com/search?q=page+magnifier&hl=en&tbs=shop %3A1&aq=f), Feb. 16, 2011.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A corrective lens system (100) for use with a video display screen (110) adapted to correct visual deficiency for a particular user, wherein said system (100) comprises:
  (a) a mounting frame (200) having a frame front surface (210), a frame rear surface (220), and a centrally disposed frame aperture (230); and
  (b) a transparent lens (300) centrally disposed in the frame aperture (230) having a lens front surface (310) and a lens rear surface (320), wherein the lens front surface (310) is shaped to correct visual deficiency for the particular user, wherein the lens rear surface (320) is shaped to correct visual deficiency for the particular user;
  wherein the system (100) is positioned at a first specific distance (400) from the video display screen (110) to correct visual deficiency, wherein the user is positioned a second specific distance (500) from the video display screen (110) to correct visual deficiency;
  wherein the system (100) corrects visual deficiency for the user in a similar manner as a pair of prescription glasses, and wherein the mounting frame (200) comprises a stand (700) disposed thereon.

* * * * *